US009864501B2

(12) United States Patent
Tuli

(10) Patent No.: US 9,864,501 B2
(45) Date of Patent: Jan. 9, 2018

(54) DISPLAYING INFORMATION

(76) Inventor: Apaar Tuli, Helsinki (FI)

( * ) Notice: Subject to any disclaimer, the term of this patent is extended or adjusted under 35 U.S.C. 154(b) by 261 days.

(21) Appl. No.: 12/847,490

(22) Filed: Jul. 30, 2010

(65) Prior Publication Data

US 2012/0030614 A1   Feb. 2, 2012

(51) Int. Cl.
  *G06F 3/00*     (2006.01)
  *G06F 3/0485*   (2013.01)

(52) U.S. Cl.
  CPC ................. *G06F 3/04855* (2013.01)

(58) Field of Classification Search
  CPC ...................... G06F 3/0481–3/0489
  USPC ........................................ 715/787
  See application file for complete search history.

(56) References Cited

U.S. PATENT DOCUMENTS

| | | | | |
|---|---|---|---|---|
| 5,075,673 A | * | 12/1991 | Yanker | 345/163 |
| 5,339,391 A | | 8/1994 | Wroblewski et al. | |
| 5,371,846 A | * | 12/1994 | Bates | 715/786 |
| 5,418,549 A | * | 5/1995 | Anderson et al. | 715/786 |
| 5,479,600 A | * | 12/1995 | Wroblewski et al. | 715/787 |
| 5,506,951 A | * | 4/1996 | Ishikawa | 715/786 |
| 5,510,808 A | * | 4/1996 | Cina et al. | 345/684 |
| 5,526,480 A | * | 6/1996 | Gibson | 715/210 |
| 5,532,715 A | * | 7/1996 | Bates | G06F 3/04855 345/684 |
| 5,592,604 A | * | 1/1997 | Marusak | 715/787 |
| 5,644,692 A | * | 7/1997 | Eick | 715/833 |
| 5,874,961 A | * | 2/1999 | Bates et al. | 715/786 |
| 5,900,872 A | * | 5/1999 | Ashe | 715/786 |
| 5,903,267 A | * | 5/1999 | Fisher | 715/786 |
| 5,923,861 A | * | 7/1999 | Bertram et al. | 715/786 |
| 5,936,625 A | * | 8/1999 | Kahl | G06Q 10/109 715/775 |
| 5,945,998 A | * | 8/1999 | Eick | 345/589 |
| 5,950,216 A | * | 9/1999 | Amro et al. | 715/209 |
| 5,973,663 A | * | 10/1999 | Bates et al. | 715/786 |
| 5,977,972 A | * | 11/1999 | Bates et al. | 715/786 |
| 6,014,140 A | * | 1/2000 | Strand | 345/684 |

(Continued)

FOREIGN PATENT DOCUMENTS

WO   WO 00/50982 A1    8/2000
WO   WO-2006/067574 A2  6/2006

OTHER PUBLICATIONS

European Search Report for Application No. EP 11 17 5085 dated Nov. 28, 2011.

(Continued)

*Primary Examiner* — Steven B Theriault
(74) *Attorney, Agent, or Firm* — Alston & Bird LLP

(57) ABSTRACT

A method comprising causing to be displayed in a display window at least one of a defined plurality of information items, causing to be displayed in a scrolling region a moveable element, in response to a scrolling input, moving the moveable element within the scrolling region and causing others of the plurality of information items to be displayed in the display window, causing to be displayed in the scrolling region a marker associated with one of the plurality of information items, the position of the marker relative to the moveable element indicating a direction of a scrolling input that would be needed to cause the one of the information items to be displayed in the display window, and causing the marker to be updated in response to an event associated with the one of the information items.

25 Claims, 14 Drawing Sheets

(56) References Cited

U.S. PATENT DOCUMENTS

| | | | |
|---|---|---|---|
| 6,147,683 A * | 11/2000 | Martinez et al. | 715/786 |
| 6,204,846 B1 * | 3/2001 | Little et al. | 715/784 |
| 6,300,967 B1 * | 10/2001 | Wagner et al. | 715/784 |
| 6,389,434 B1 * | 5/2002 | Rivette et al. | 715/209 |
| 6,476,831 B1 * | 11/2002 | Wirth et al. | 715/784 |
| 6,509,915 B2 * | 1/2003 | Berman et al. | 715/840 |
| 6,533,822 B2 * | 3/2003 | Kupiec | 715/253 |
| 6,585,776 B1 * | 7/2003 | Bates et al. | 715/206 |
| 6,590,595 B1 * | 7/2003 | Wagner et al. | 715/784 |
| 6,647,534 B1 * | 11/2003 | Graham | 715/205 |
| 6,657,644 B1 * | 12/2003 | Plow et al. | 715/786 |
| 6,658,626 B1 * | 12/2003 | Aiken | 715/205 |
| 6,738,084 B1 * | 5/2004 | Kelley et al. | 715/784 |
| 6,738,787 B2 * | 5/2004 | Stead | 715/830 |
| 6,771,284 B1 * | 8/2004 | Anderson et al. | 715/705 |
| 6,778,192 B2 * | 8/2004 | Arbab et al. | 715/786 |
| 6,803,930 B1 * | 10/2004 | Simonson | 715/784 |
| 6,828,989 B2 * | 12/2004 | Cortright | G06F 3/04847 715/768 |
| 6,972,776 B2 * | 12/2005 | Davis et al. | 345/684 |
| 7,109,848 B2 * | 9/2006 | Schybergson | G06Q 10/109 340/309.7 |
| 7,228,492 B1 * | 6/2007 | Graham | 715/234 |
| 7,424,686 B2 * | 9/2008 | Beam et al. | 715/810 |
| 7,479,949 B2 * | 1/2009 | Jobs et al. | 345/173 |
| 7,490,297 B2 * | 2/2009 | Bates et al. | 715/784 |
| 7,523,412 B2 * | 4/2009 | Jones et al. | 715/787 |
| 7,565,623 B2 * | 7/2009 | Beam et al. | 715/810 |
| 7,574,669 B1 * | 8/2009 | Braun | G06F 3/0483 715/776 |
| 7,577,923 B2 * | 8/2009 | Beam et al. | 715/840 |
| 7,689,928 B1 * | 3/2010 | Gilra | 715/787 |
| 7,765,491 B1 * | 7/2010 | Cotterill | 715/833 |
| 7,770,130 B1 * | 8/2010 | Kaptelinin | 715/787 |
| 7,793,230 B2 * | 9/2010 | Burns et al. | 715/787 |
| 7,836,408 B1 * | 11/2010 | Ollmann et al. | 715/787 |
| 7,853,900 B2 * | 12/2010 | Nguyen et al. | 715/861 |
| 7,869,833 B2 * | 1/2011 | Kim | G06Q 10/02 455/466 |
| 7,877,708 B2 * | 1/2011 | Zinn et al. | 715/864 |
| 7,917,867 B2 * | 3/2011 | Wattenberg et al. | 715/823 |
| 7,930,646 B2 * | 4/2011 | De Souza Sana et al. | 715/784 |
| 7,966,571 B2 * | 6/2011 | Phillips | 715/784 |
| 7,990,394 B2 * | 8/2011 | Vincent et al. | 345/629 |
| 8,018,432 B1 * | 9/2011 | Chakravarty et al. | 345/156 |
| 8,245,255 B2 * | 8/2012 | Schlarb | 725/52 |
| 8,255,238 B2 * | 8/2012 | Powell et al. | 705/3 |
| 8,314,789 B2 * | 11/2012 | Fitzmaurice et al. | 345/419 |
| 8,359,545 B2 * | 1/2013 | Pixley et al. | 715/786 |
| 8,381,121 B2 * | 2/2013 | Gupta et al. | 715/784 |
| 8,539,339 B2 * | 9/2013 | Lloyd et al. | 715/234 |
| 8,582,849 B2 * | 11/2013 | Eichhorn et al. | 382/128 |
| 8,584,034 B2 * | 11/2013 | Holt et al. | 715/784 |
| 8,799,826 B2 * | 8/2014 | Missig | G06F 3/0486 715/801 |
| 8,977,982 B1 * | 3/2015 | Amacker | G06F 3/014 715/784 |
| 9,154,606 B2 * | 10/2015 | Tseng | H04M 1/72552 |
| 2002/0145631 A1 * | 10/2002 | Arbab et al. | 345/786 |
| 2002/0186251 A1 * | 12/2002 | Himmel et al. | 345/784 |
| 2002/0186252 A1 * | 12/2002 | Himmel et al. | 345/787 |
| 2004/0226012 A1 * | 11/2004 | Awada | G06F 3/04842 718/100 |
| 2005/0075097 A1 * | 4/2005 | Lehikoinen | G06F 17/3089 455/414.1 |
| 2005/0091604 A1 * | 4/2005 | Davis | 715/772 |
| 2005/0210403 A1 * | 9/2005 | Satanek | 715/786 |
| 2006/0010382 A1 * | 1/2006 | Ejiri | G06Q 10/109 715/712 |
| 2006/0048073 A1 * | 3/2006 | Jarrett et al. | 715/784 |
| 2006/0059063 A1 * | 3/2006 | LaComb et al. | 705/35 |
| 2006/0075358 A1 * | 4/2006 | Ahokas | 715/784 |
| 2006/0101351 A1 * | 5/2006 | Cowham | G06Q 10/107 715/783 |
| 2006/0136838 A1 * | 6/2006 | Nurmi | 715/786 |
| 2006/0184901 A1 * | 8/2006 | Dietz | G06F 3/04855 715/855 |
| 2007/0083823 A1 * | 4/2007 | Jaeger | 715/787 |
| 2007/0143705 A1 * | 6/2007 | Peters | 715/786 |
| 2007/0237032 A1 * | 10/2007 | Rhee | H04M 1/72552 368/10 |
| 2008/0016467 A1 * | 1/2008 | Chambers | G06F 3/0485 715/835 |
| 2008/0081594 A1 * | 4/2008 | Lee | H04M 1/72566 455/412.2 |
| 2008/0178116 A1 * | 7/2008 | Kim | G06F 3/04855 715/786 |
| 2008/0209546 A1 * | 8/2008 | Kim | G06F 3/0482 726/19 |
| 2008/0307323 A1 * | 12/2008 | Coffman | G06Q 10/109 715/753 |
| 2009/0044142 A1 * | 2/2009 | Faris | G06F 17/30873 715/780 |
| 2009/0070707 A1 * | 3/2009 | Schaller et al. | 715/787 |
| 2009/0100373 A1 * | 4/2009 | Pixley et al. | 715/786 |
| 2009/0106687 A1 * | 4/2009 | De Souza Sana et al. | 715/784 |
| 2009/0228828 A1 * | 9/2009 | Beatty et al. | 715/786 |
| 2009/0241048 A1 * | 9/2009 | Augustine et al. | 715/769 |
| 2009/0289913 A1 * | 11/2009 | Chang | G06F 3/0485 345/173 |
| 2010/0058228 A1 * | 3/2010 | Park | G06F 3/04847 715/786 |
| 2010/0077002 A1 * | 3/2010 | Funch | G06F 3/0482 707/779 |
| 2010/0077343 A1 * | 3/2010 | Uhl | G06F 3/04855 715/787 |
| 2010/0107066 A1 * | 4/2010 | Hiitola et al. | 715/702 |
| 2010/0131886 A1 * | 5/2010 | Gannon | G06F 3/0485 715/786 |
| 2010/0153875 A1 * | 6/2010 | O'Flynn | G08G 5/0082 715/786 |
| 2011/0007014 A1 * | 1/2011 | Chang | 345/173 |
| 2011/0165913 A1 * | 7/2011 | Lee | G06F 3/0488 455/566 |
| 2011/0202866 A1 * | 8/2011 | Huang | G06F 3/0482 715/779 |
| 2011/0202871 A1 * | 8/2011 | Bair | G06F 3/04855 715/786 |
| 2012/0011430 A1 * | 1/2012 | Parker | G06F 3/0485 715/234 |
| 2012/0030614 A1 * | 2/2012 | Tuli | 715/786 |
| 2012/0036455 A1 * | 2/2012 | Holt et al. | 715/753 |

OTHER PUBLICATIONS

Office Action for European Application No. 11 175 085.7 dated Jun. 12, 2017.

* cited by examiner

DISPLAYING INFORMATION

FIELD

The invention relates to an apparatus and method for graphically updating a marker associated with an item of information.

BACKGROUND

User interfaces which incorporate a scrolling bar for scrolling information within a display window have proved a popular solution to displaying relatively large amounts of information via a relatively small display screen. It would be desirable to improve such user interfaces for greater ease of use.

SUMMARY

According to a first aspect, this specification provides a method comprising:
  causing to be displayed in a display window at least one of a defined plurality of information items;
  causing to be displayed in a scrolling region a moveable element
  in response to a scrolling input, moving the moveable element within the scrolling region and causing others of the plurality of information items to be displayed in the display window;
  causing to be displayed in the scrolling region a marker associated with one of the plurality of information items,
  the position of the marker relative to the moveable element indicating a direction of a scrolling input that would be needed to cause the one of the information items to be displayed in the display window; and
  causing the marker to be updated in response to an event associated with the one of the information items.

The location of the moveable element with respect to the location of the marker in the scrolling region may indicate the direction of the scrolling input needed to cause said one information item to be displayed in the display window.

The location of the moveable element in the scrolling region may represent a location of whichever of the information items are currently displayed in the display window with respect to a location of a remainder of the plurality of information items; and the location of the marker in the scrolling region may represent a location of said one information item with respect to a location of a remainder of the plurality of information items.

The location of the marker may represent the location of said one information item irrespective of the location of the moveable element in the scrolling region.

The method may comprise causing said one information item to be displayed in the display window in response to the moveable element being moved to substantially the same location as the marker in the scrolling region.

The method may comprise causing said one information item to be displayed in the display window automatically in response to said updating of the marker.

The event may comprise a change in position of said one item relative to a location of the remainder of the plurality of information items.

Updating the marker may comprise causing the marker to be displayed in a different position in the scrolling region to reflect the change in location of said one item.

The event may comprise a change in a status of said one item.

Updating the marker may comprise causing the marker to enlarge or reduce in size.

Updating the marker may comprise causing the marker to change in colour.

Updating the marker may comprise causing information displayed within the marker to be changed.

The method may comprise determining said one item of information in response to a user selection.

Selection of said one item of information may be predetermined.

The method may comprise causing a direction indicator to be displayed with the marker to indicate the scrolling direction of the scrolling input needed to cause said one information item to be displayed in the display.

The method may comprise causing the scrolling region to be displayed concurrently with the display window.

According to a second aspect, this specification provides a computer program comprising instructions which, when executed by a processor, cause the processor to perform the method.

According to a third aspect, this specification provides a non-transitory computer-readable storage medium having stored thereon computer-readable code, which, when executed by computer apparatus, causes the computer apparatus to:
  display in a display window at least one of a defined plurality of information items;
  display in a scrolling region a moveable element
  in response to a scrolling input, move the moveable element within the scrolling region and display others of the plurality of information items in the display window;
  display in the scrolling region a marker associated with one of the plurality of information items, the position of the marker relative to the moveable element indicating a direction of a scrolling input that would be needed to cause the one of the information items to be displayed in the display window; and
  update the marker in response to an event associated with the one of the information items.

According to a fourth aspect, this specification provides an apparatus comprising:
  at least one processor: and
  at least one memory including computer program code,
  wherein the at least one memory and the computer program code are configured, with the at least one processor, to cause the apparatus to:
  display in a display window at least one of a defined plurality of information items;
  display in a scrolling region a moveable element
  in response to a scrolling input, move the moveable element within the scrolling region and display others of the plurality of information items in the display window;
  display in the scrolling region a marker associated with one of the plurality of information items, the position of the marker relative to the moveable element indicating a direction of a scrolling input that would be needed to cause the one of the information items to be displayed in the display window; and
  update the marker in response to an event associated with the one of the information items.

The location of the moveable element with respect to the location of the marker in the scrolling region may indicate the scrolling direction needed to cause said one of the information items to be displayed in the display window.

The location of the moveable element in the scrolling region may represent a location of whichever of the information items are currently displayed in the display window with respect to a location of a remainder of the plurality of information items; and the location of the marker in the scrolling region may represent a location of the said one information item with respect to a location of a remainder of the plurality of information items.

The location of the marker may represent the location of said one item irrespective of the location of the moveable element in the scrolling region.

The at least one memory and the computer program code may be configured, with the at least one processor, to cause the apparatus to display said one item of information in the display window in response to the moveable element being moved to substantially the same location as the marker in the scrolling region.

The at least one memory and the computer program code may be configured, with the at least one processor, to cause the apparatus to display said one item of information in the display window automatically in response to the marker being graphically updated.

The event may comprise a change in location of said one item relative to a location of a remainder of the plurality of information items.

The at least one memory and the computer program code may be configured, with the at least one processor, to cause the apparatus to update the marker by moving the marker in the scrolling region to reflect the change in location of said one item.

The event may comprise a change in a status of said one item.

The at least one memory and the computer program code may be configured, with the at least one processor, to cause the apparatus to update the marker by enlarging or reducing the size of the marker.

The at least one memory and the computer program code may be configured, with the at least one processor, to cause the apparatus to update the marker by changing the colour of the marker.

The at least one memory and the computer program code may be configured, with the at least one processor, to cause the apparatus to determine said one item of information in response to a user selection.

Selection of said one item of information may be predetermined.

The at least one memory and the computer program code may be configured, with the at least one processor, to cause the apparatus to display a direction indicator with the marker to indicate the scrolling direction needed to cause said one information item to be displayed in the display.

The at least one memory and the computer program code may be configured, with the at least one processor, to cause the apparatus to display the scrolling region concurrently with the display window.

According to a fifth aspect, this specification provides an apparatus comprising:
  means for causing to be displayed in a display window at least one of a defined plurality of information items;
  means for causing to be displayed in a scrolling region a moveable element
  means for, in response to a scrolling input, causing the moveable element to move within the scrolling region and causing others of the plurality of information items to be displayed in the display window;
  means for causing to be displayed in the scrolling region a marker associated with one of the plurality of information items, the position of the marker relative to the moveable element indicating a direction of a scrolling input that would be needed to cause the one of the information items to be displayed in the display window; and
  means for causing the marker to be updated in response to an event associated with the one of the information items.

BRIEF DESCRIPTION OF THE DRAWINGS

Exemplary embodiments of the invention are described below with reference to the accompanying drawings, in which.

DETAILED DESCRIPTION OF THE EMBODIMENTS

Figure 1:
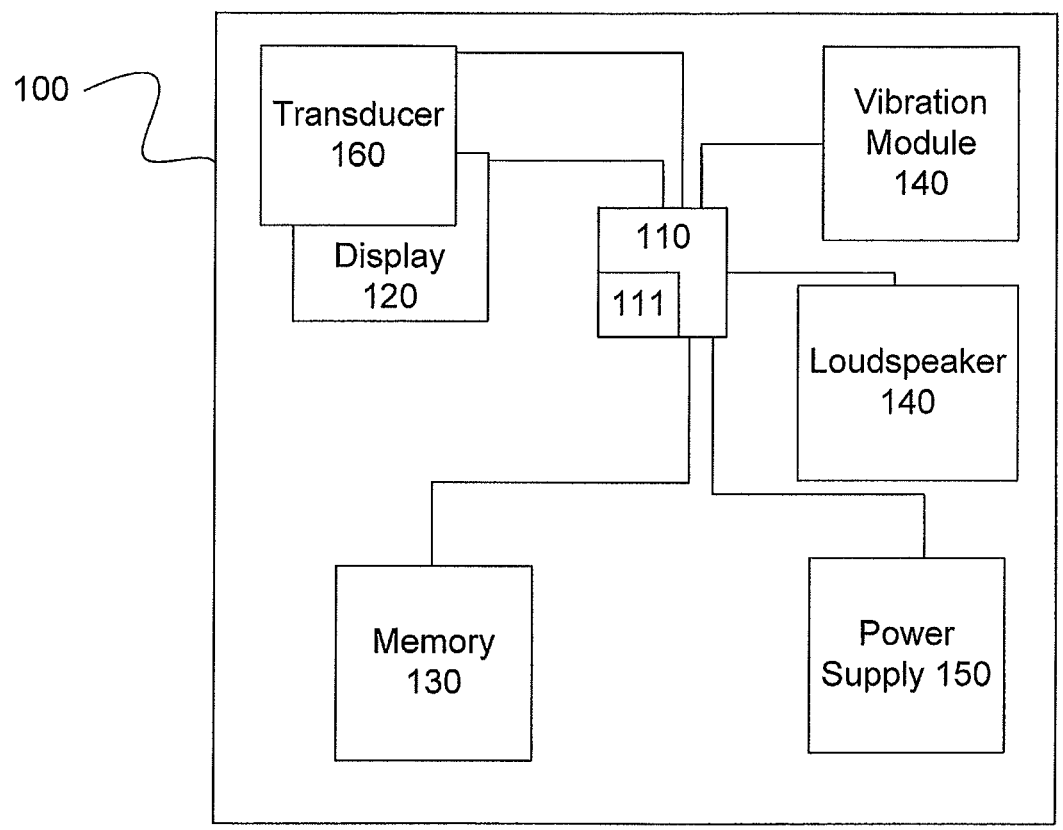
FIG. 1 is schematic diagram of an apparatus for displaying a plurality of items of information on a display screen.

In the description and drawings, like reference numerals refer to like elements throughout.

Figure 2:
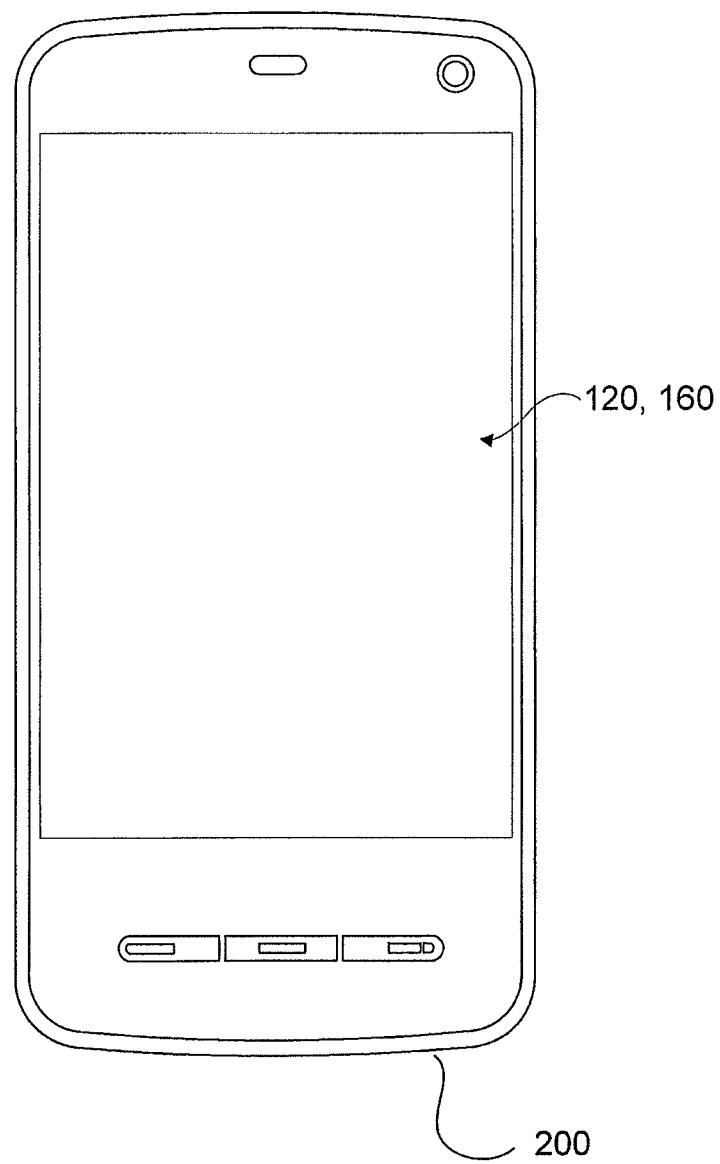
FIG. 2 is an illustration of an electronic device comprising a mobile telephone.

FIG. 1 is a simplified schematic of an electronic apparatus 100. As will be understood from the following description, the electronic apparatus 100 may be comprised in a single electronic device 200 or may be distributed. An example electronic device 200 comprising a mobile (e.g. cellular) telephone terminal 200 is shown in FIG. 2. However, the electronic device 200 could alternatively be another type of device such as a PDA, a positioning device (e.g. a GPS module), a music player, a gaming console or a personal computer. Furthermore, although the electronic device shown in FIG. 2 is portable, the invention is also applicable to non-portable devices.

The electronic apparatus 100 comprises a controller 110, which is configured to control the output of a display panel 120. The controller 110 includes one or more processors 111 operating under the control of computer readable code optionally stored on a non-transitory memory medium 130 such as ROM or RAM. The controller 110 may also comprise one or more application-specific integrated circuits (ASICs) (not shown).

The controller 110 may be configured to control the output of one or more non-visual output transducers 140 for providing non-visual feedback to a user. For example the non-visual output transducers 140 may comprise a loudspeaker and/or a vibration module to provide alerts or other non-visual information to a user of the apparatus 100.

A power supply 150 is configured to supply power to the components of the apparatus 100. The power supply 150 may comprise a suitable re-chargeable battery or fuel cell. Additionally or alternatively, the power supply 150 can be configured to receive power from a mains electricity supply.

A touch-sensitive transducer 160 may be configured to supply signals indicative of tactile inputs incident on the touch-sensitive transducer 160 to the controller 110. For example, the touch-sensitive transducer 160 can be a touch-sensitive panel 160 overlaid on the display panel 120 to form a touch-sensitive screen 120, 160. The touch sensitive transducer 160 is configured to generate and supply the signals to the controller 110 in response to detecting a tactile input at the screen 120, 160.

The apparatus 100 may also comprise, in addition to those components described above, other elements such as, but not limited to, a camera, depressible keys, a microphone, an antenna and transceiver circuitry.

Figure 3A:
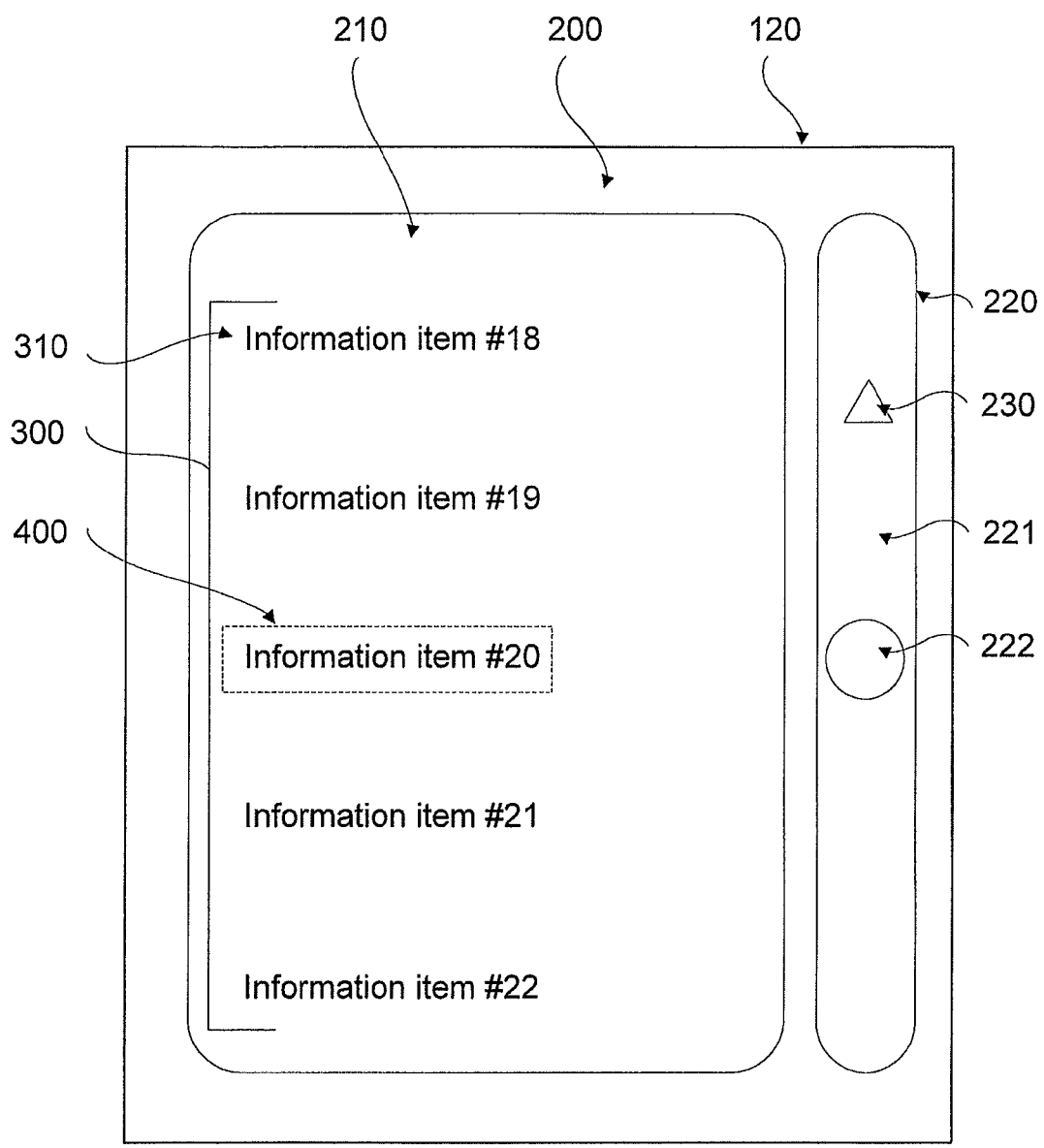
FIG. 3A is an illustration of a first screen shot of a user interface comprising a display window and scrolling region comprising a location indicator and a marker displayed at different locations.
Figure 3B:
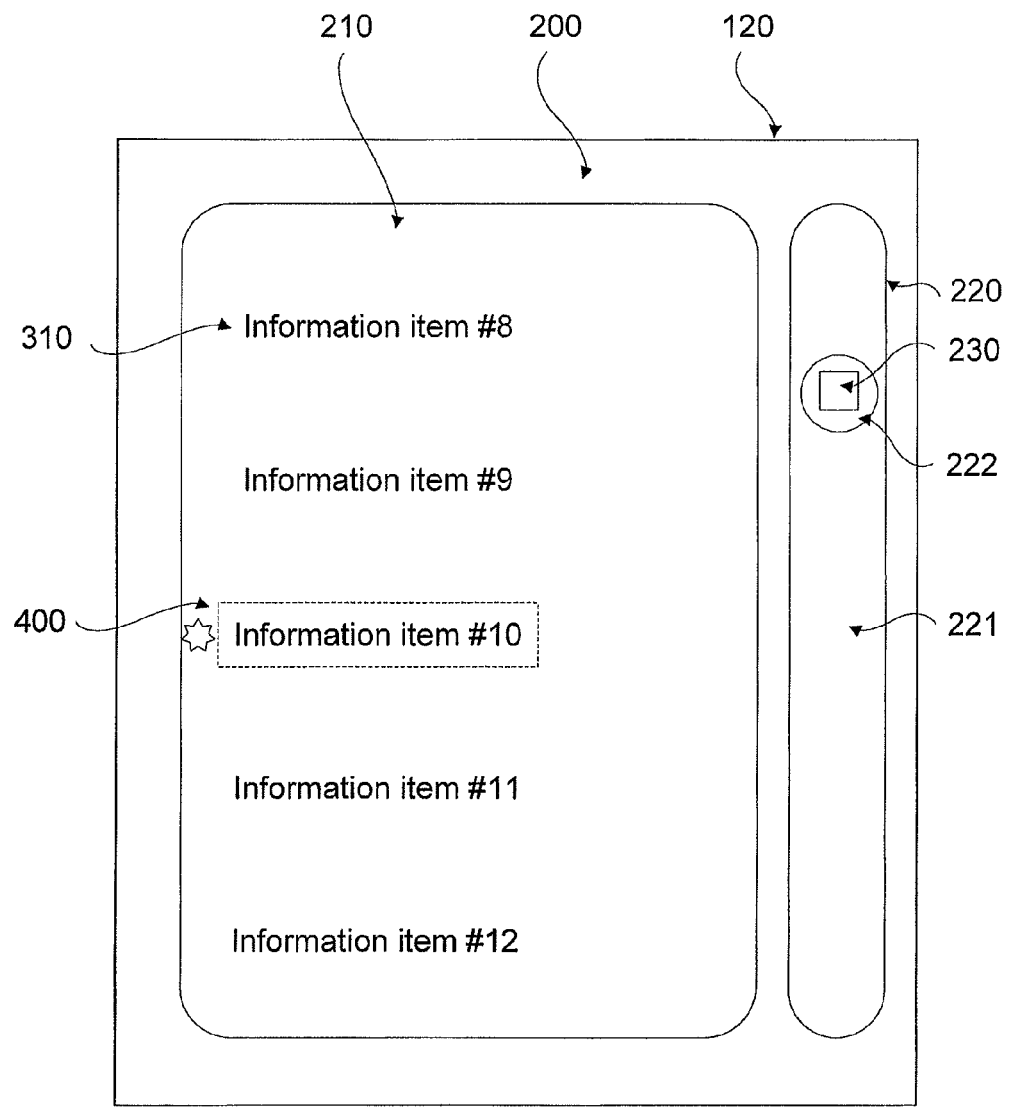
FIG. 3B is an illustration of a second screen shot of the user interface shown in FIG. 3A, in which the location indicator and the marker are displayed at substantially the same location.

The display panel 120 is configured to display a user interface 200 under the control of the controller 110. An example user interface 200 is illustrated in FIGS. 3A and 3B. The user interface 200 is implemented as a computer program, or software, that is configured to operate along with user interface hardware, including the display 120, 160 and optionally a keypad/keyboard (not shown) comprised in the user interface 200 or elsewhere in the apparatus 100. The user interface software may be separate from an operating system stored in the memory 130, in which case it interacts closely with the operating system as well as applications stored in the memory 130. Alternatively, the user interface software may be integrated with the operating system.

Referring to FIGS. 3A and 3B, the user interface 200 can comprise a display window 210 for displaying information 300 and other graphics to a user. The information 300 displayed in the display window 210 can comprise items 310 of information such as user selectable icons, images and/or text. The items of information 310 can be displayed as an array, for example as a menu comprising a list of user selectable options.

A user may select individual items of information 310 by operating the keypad/keyboard to move a cursor or pointer (not shown) displayed on the display panel 120. Alternatively, items of information 310 can be selected by touching the touch-sensitive screen 120, 160 at an appropriate position.

The user interface 200 can also comprise a scrolling region 220 for scrolling information in the display window 210. The scrolling region 220 can, for example, comprise a scroll bar 221 and a moveable element comprising a location indicator 222 displayed within the scroll bar 221. The position of the location indicator 222 within the scroll bar 221 represents the position of the information currently displayed in the display window 210, relative to a remainder of the information which is not currently displayed in the display window 210. For example the position of the location indicator 222 in FIG. 3A indicates that the items of information 310 displayed in the window 210 are approximately halfway down a list information items 310, some of which are not currently displayed in the window 210.

The location indicator 222 can be moved along the scroll bar 221 to scroll the information 300 in the display window 210, thereby causing different items of the information from the list to be displayed in the display window 210. The act of scrolling may comprise sliding information, for example icons, text, images or video, across the display window 210 to incrementally move a user's view across the information as whole. For example, referring to FIGS. 3A and 3B, the information 300 as a whole may comprise a list of 40 items 310 of information, five of which can be displayed in the display window 210 at any one time. The location indicator 222 can be moved within the scroll bar 221 by dragging the location indicator 222 using the cursor/pointer referred to above, or by using the touch sensitive screen 120, 160.

As shown in FIGS. 3A and 3B, the user interface 200 may also display a selection indicator 400. The selection indicator 400 is displayed in the display window 210 and provides to a user an indication of the item of information 310 which is currently selected. In FIGS. 3A and 3B, the currently selected item of information is located in the centre of the display window 210. The indicator 400 may comprise a highlighted region or any other suitable means for visually indicating a currently selected information item 310. For example, in FIGS. 3A and 3B, the selection indicator 400 is shown as a rectangular box surrounding the currently selected information item 310.

A marker 230 associated with a particular item 310 of the information can be displayed within the scrolling region 220, for example in the scroll bar 221, to indicate the location of the marked item 310 relative to the remainder of the information items 310. The item of information 310 with which the marker 230 is associated can be predetermined, or can be selected by a user by inputting a command to the apparatus 100 using the pointer/cursor, touch-screen 120, 160 or other suitable input means on the electronic device 200.

The marker 230 is configured to show the relative location of the marked item 310 of information with respect to the information 300 as a whole, regardless of whether the marked item 310 of information is currently being displayed in the display window 210. For example, using the example shown in FIGS. 3A and 3B, the marker 230 can be associated with the tenth item 310 of information in a list consisting of 40 equally spaced items 310. In this case, the marker 230 can be positioned one quarter of the distance along the scroll bar 221. The location of the marker 230 in the scroll bar 221 is independent of the current position of the location indicator 222 and the information currently displayed in the display window 210.

The marker 230 may comprise a direction arrow to indicate the direction in which the location indicator 222 should be moved in the scroll bar 221 in order to display the marked item 310 of information in the display window 210. This is shown in FIG. 3A, in which the marker 230 comprises an upward pointing arrow to indicate that the location indicator 222 should be moved up the scroll bar 221 in order to view the marked item of information 310.

The marker 230 can be used to cause the item of information 310 with which it is associated to be displayed quickly in the display window 210 without the need for the user to search for the item by scrolling through the information as whole. For example, the marked item of information 310 can be displayed in the display window 210 by dragging the location indicator 222 directly to the location of the marker 230 in the scroll bar 221. Alternatively, the controller 110 may cause the item of information to be displayed in the display window 210 automatically in response to a user selecting the marker 230 with the pointer/cursor or touching the marker 230 via the touch-screen 110, 160. FIG. 3B illustrates a situation in which the location indicator 222 has been moved to the position of the marker 230 so that the marked information item 310 is displayed in the display window 210. The item of information associated with the marker 230 may be highlighted in the display window 210, for example by displaying a star next the item as shown in FIG. 3B. As can be seen in FIG. 3B, when the location indicator 222 is positioned at substantially the same location in the scroll bar 221 as the marker 230, the marker 230 does not comprise an arrow indicating a scrolling direction.

In addition to the location information described above, the marker 230 can provide auxiliary information related to the marked item of information 310. For example, the controller 110 may cause the marker 230 to be automatically graphically updated in response to the occurrence of an event associated with the marked item of information 310. The graphical update can, for example, comprise a change in the appearance of the marker 230 such as a change in colour or shape, or the appearance of text information in the marker 230 to indicate the event. Alternatively, the graphical update can comprise a change in the location of the marker 230 within the scroll bar 221.

The auxiliary information represented by a graphical update of the marker 230 can be related to, or represent, the event which caused the graphical update to be made. Events may comprise, for instance, a change in the status of the marked information item 310, or a change in the relative location of the marked information item 310 within the information 300 as a whole. Specific examples are described below, although it will be understood that the invention is not limited to the examples. Furthermore, aspects discussed in relation to one of the examples below are equally applicable to all other examples. In general terms, the graphical update provides a means by which the marker 230 can alert a user to an event associated with the marked information item 310, even when the marked item is not currently displayed in the display window 210.

Figure 4A:
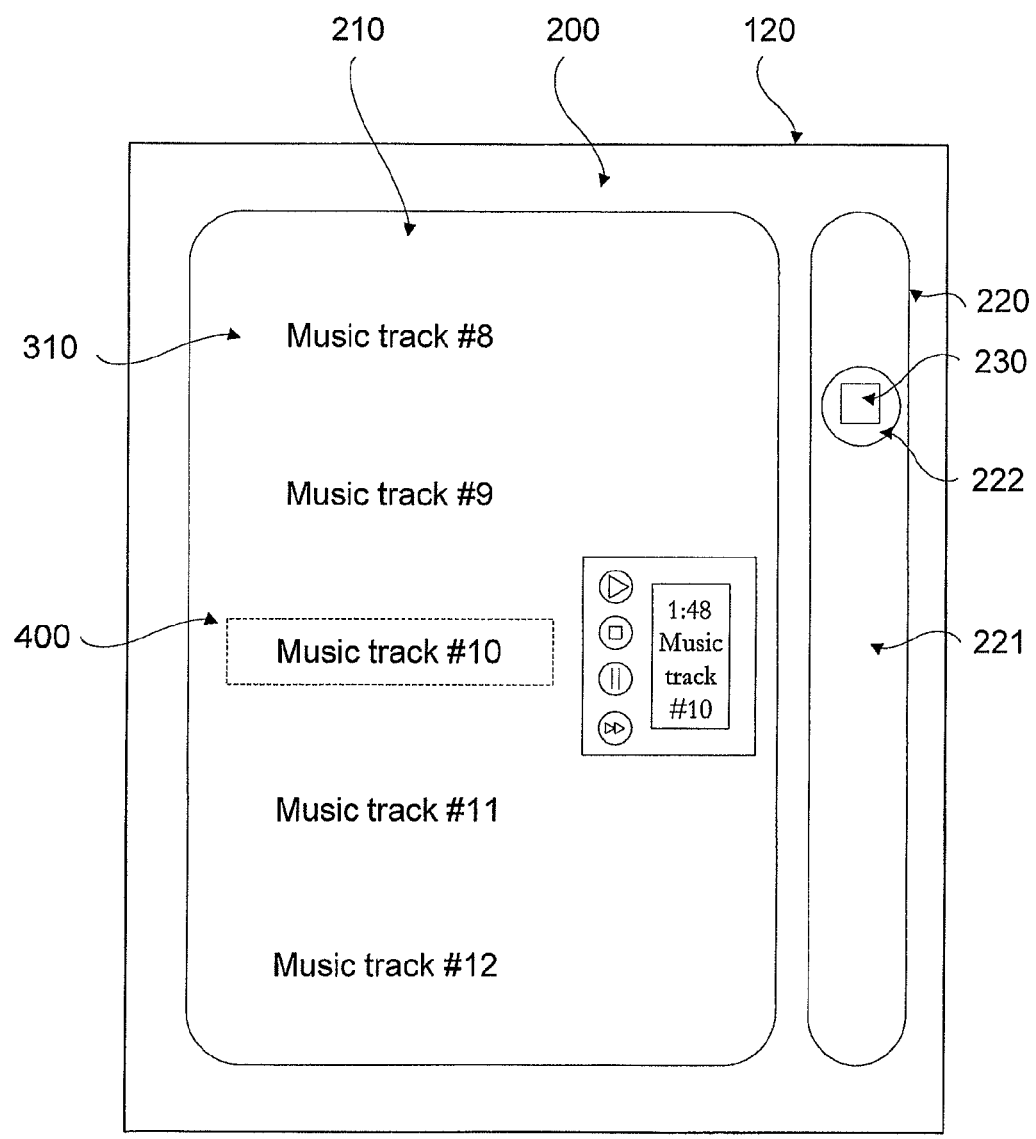
FIG. 4A is an illustration of a first screen shot of a user interface of a media player in which a portion of a list of media items and a control panel for controlling playback of the media items are displayed in a display window. The location of a currently selected media item and the control panel is marked in a scrolling region with a marker. The marker is displayed in the scrolling region at substantially the same location as a location indicator.
Figure 4B:
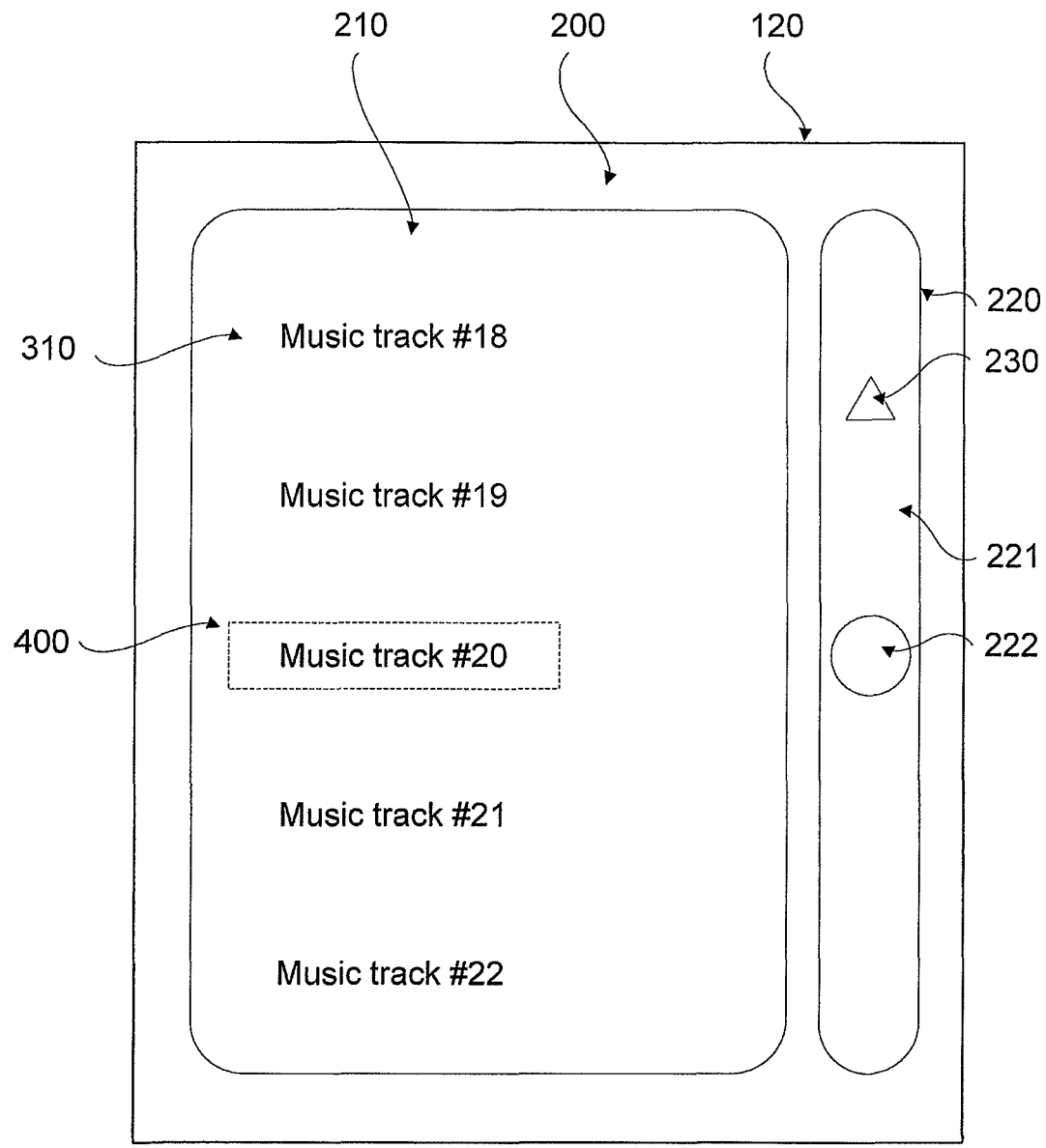
FIG. 4B is an illustration of a second screen shot of the user interface shown in FIG. 4A, in which the location indicator is displayed at a different location in the scrolling region to the marker. The currently selected media item and the control panel are not displayed in the display window.
Figure 4C:
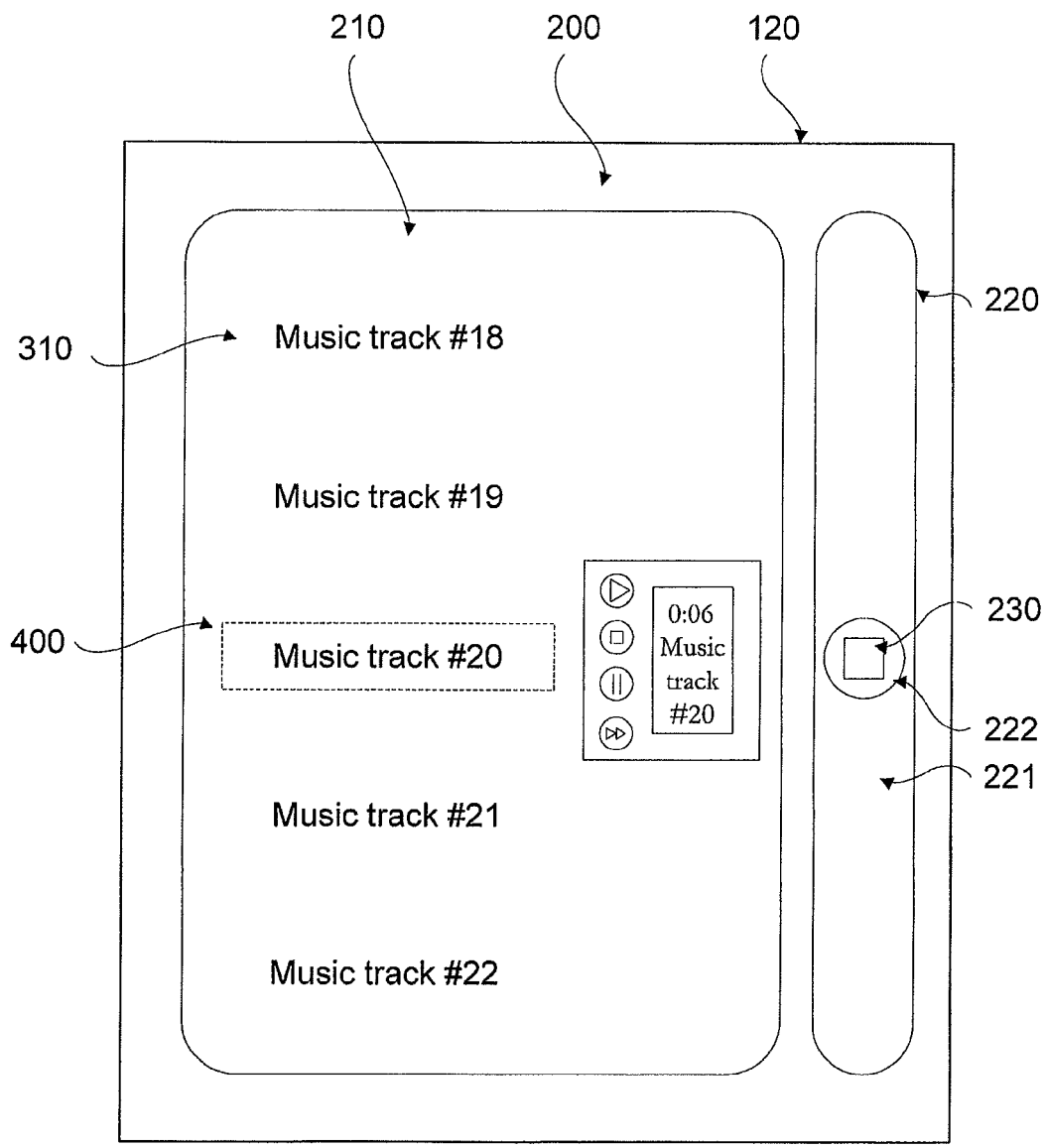
FIG. 4C is an illustration of a third screen shot of a the user interface shown in FIGS. 4A and 4B, in which the currently selected media item has changed and the location of the control panel has moved relative to the list of media items so as to be located adjacent the newly selected media item. The marker has moved in the scrolling region to reflect the location of the newly selected media item and the control panel. The control panel and selected media item are displayed in the display window and the location indicator is displayed in the scrolling region at substantially the same location as the marker.

FIGS. 4A, 4B and 4C illustrate an example of the user interface 200 discussed above. The user interface shown in FIGS. 4A, 4B and 4C is associated with a media player. A portion of a list of media items 310, such as music tracks or videos, is displayed in the display window 210. The remainder of the list of media items 310 can be selectively displayed in the window 210 by scrolling through the list using the scrolling region 220. This can be achieved by moving the position of the location indicator 222 in the scroll bar 221, as previously described. The user can select one of the media items 310 to be played by selecting the item from the list, for example by moving the selection indicator 400 using the pointer/cursor or touch-screen 110, 160 referred to above.

In addition to the list of media items, a control panel 240 can be displayed in the window 210. The control panel 240 comprises a number of control icons for controlling the playback of a selected media item. For example, the icons can comprise "stop", "pause", "play", "skip", "rewind", "fast-forward", "volume up/down" and other acoustic controls. The control panel 240 may also comprise text information such as the name of the selected media item, the time elapsed and the time left to run before playback of the media item ends.

As shown in FIG. 4A, the control panel 240 is linked to, and displayed in the display window 210 immediately adjacent to, the media item 310 currently being played. If no media item is currently being played, the control panel 240 can be linked and displayed next to the most recently played item. If the media item currently being played is not displayed in the display window 210, for example because a user has scrolled away from the currently playing media item to view different items in the list, then the control panel 240 is not displayed. This is shown in FIG. 4B.

In the example shown in FIGS. 4A, 4B and 4C the marker 230 is associated with the currently playing (selected) media item. Therefore, the marker 230 indicates in the scroll bar 231 the relative location of the currently playing media item with respect to the information as a whole. Due to the control panel 240 being displayed adjacent to the currently playing media item 310, the marker 240 also indicates the location of the control panel 240 with respect to the information 300 as a whole.

If the currently playing media item 310 changes, for example due to a user selecting a new media item 310 for immediate playback using the cursor/pointer or touch-screen 120, 160, then the marker 230 is automatically associated with the newly playing media item 310 instead of the previously playing media item 310. The location of the control panel 240 is updated so as to be located adjacent to the newly playing media item.

If the newly playing media item is currently displayed in the display window 210, the control panel 240 is displayed in the display window 210 immediately adjacent to the media item. This is shown in FIG. 4C. As will be understood from the explanation above, if the newly playing media item 310 is not currently displayed in the display window 210, the control panel 210 is also not displayed in the display window 210.

The marker 230 is graphically updated to reflect the fact that the marker 230 has been linked to the newly playing media item 310, and is no longer linked to the previously playing media item. Since the newly playing media item 310 is located at a different relative position in the information as a whole than the previously playing media item 310, the location of the marker 230 in the scroll bar 221 is updated to reflect the fact that the position of the "currently selected" media item has changed. For example, if the previously playing media item 310 was the tenth item in a list of 40 items and the newly playing media item is the twentieth item in the same list, the location of the marker 230 in the scroll bar changes from ¼ of the distance along the scroll bar 221 to ½ of the distance along the scroll bar 221.

Thus the user is always able to easily navigate to the currently playing media item, and hence the control panel 240, using the marker 230, regardless of whether the currently playing media item and control panel 240 is part of the information currently being displayed in the display window 210. There is no requirement for the user to make a visual search for the selected media item or control panel 240 by scrolling the information through the display window 210 and checking/waiting for the currently selected media item and control panel 240 to appear in the window 210.

The marker 230 also makes it unnecessary for the control panel 240 to be displayed in a separate display window to the list of media items, therefore allowing the display window 210 containing the list of media items to occupy a relatively larger area of the display screen 120, 160.

As an alternative, the marker 230 can be associated directly with the control panel 240 so as to mark the relative location of the control panel 240 in the scrolling region 220 with respect to the list of media items. In this case, the control panel 240, in addition to the media items, is one of the plurality of information items 310 and is not necessarily located adjacent the currently selected media item 310.

Figure 5A:
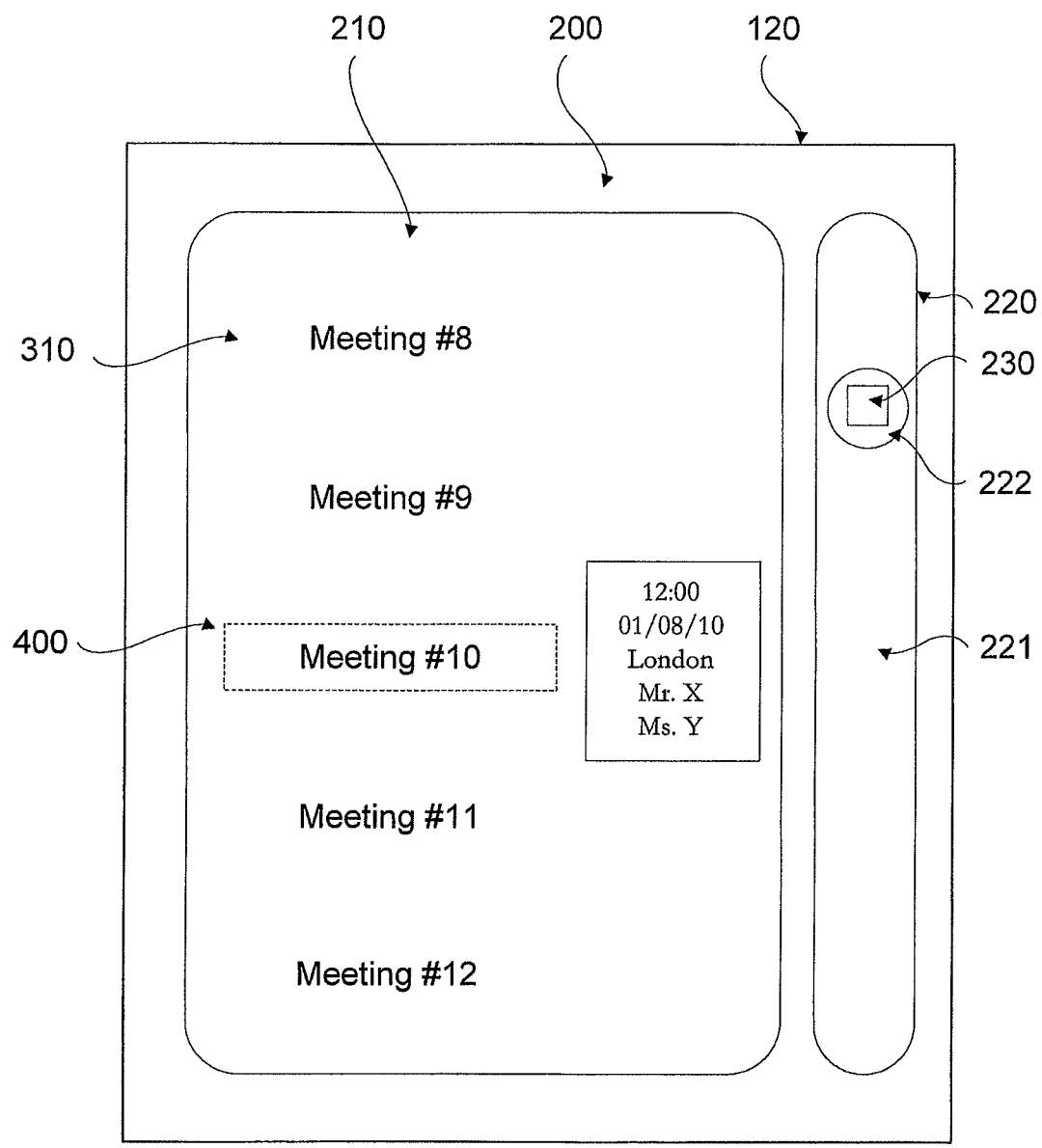
FIG. 5A is an illustration of a first screen shot of a user interface of a networking website. A particular one of a plurality of networking items is marked by a marker in a scrolling region. The marker is displayed in the scrolling region at substantially the same location as a location indicator. The marked item is displayed in a display window.
Figure 5B:
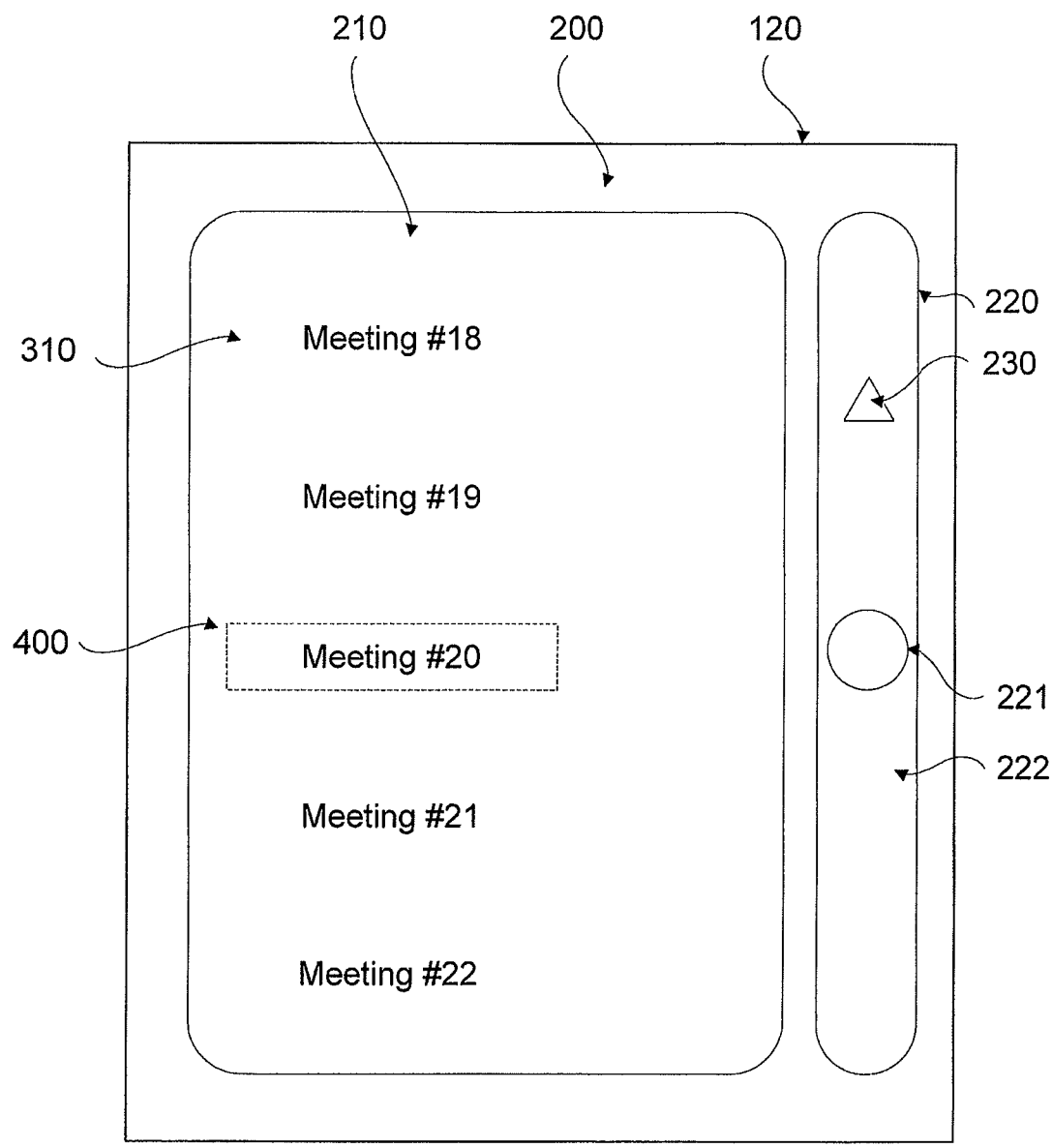
FIG. 5B is an illustration of a second screen shot of the user interface shown in FIG. 5A, in which the location indicator is displayed at a different location in the scrolling region to the marker. The marked item is not displayed in the display window.
Figure 5C:
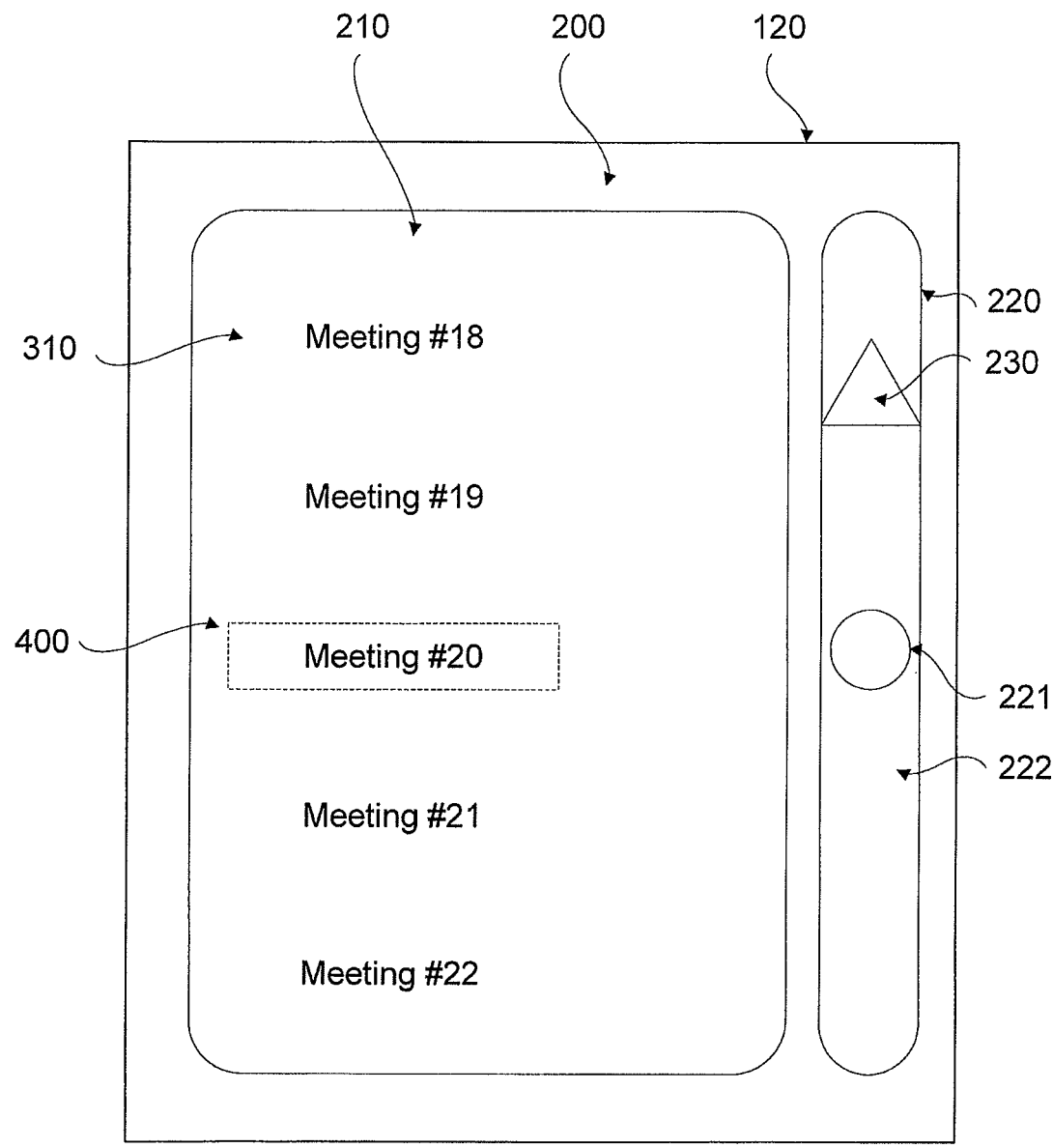
FIG. 5C is an illustration of a third screen shot of the user interface shown in FIG. 5A, in which the marker has been graphically updated by an increase in size to represent the occurrence of an event associated with the marked item.

FIGS. 5A, 5B and 5C illustrate another example of the user interface 200. The user interface 200 shown in FIGS. 5A to 5C is associated with a social or business networking website. A portion of a list of information items 310 is displayed in the display window 210. The remainder of the items 310 in the list can be selectively displayed in the display window 210 by scrolling through the list using the scrolling region 220. This can be achieved by moving the location of the position indicator 222 in the scroll bar 221, as previously described.

The information items 310 may comprise social and/or business contacts, activity streams for particular persons, social/business events, meetings, appointments, reminders and other types of networking information. A user can select one of the items 310 using the cursor/pointer/touch-screen 120, 160 as previously described. Selection of an item 310 may cause extra information associated with the item 310 to be displayed in the display window 210. For example, if the selected item 310 is a business or social meeting, the time, date, location and attendees can be displayed. This is shown in FIG. 5A.

The marker 230 in this example is associated with a social/business meeting (Meeting #10) from the list of information items 310. Therefore, the marker 230 indicates in the scroll bar 221 the relative location of the marked meeting 310 with respect to the information 300 as whole. It will be appreciated however that the description below could apply to the marker 230 being associated with any other information item 310 from the list.

The marker 230 is graphically updated in response to the occurrence of an event associated with the information item 310 with which the marker 230 is associated. For example, the event can be a change in the time/date/attendees etc. of the business/social meeting with which the marker 230 is associated. In response to the event, the marker 230 is graphically updated so that, even if the business/social meeting is not currently being displayed in the display window 210, a visual alert is provided in the scrolling region 220 to indicate that the event associated with the business/social event has occurred. As described above, the graphical update can be a change in the appearance of the marker 230 such as a change in colour or shape, or an increase/decrease in size. Alternatively, the graphical update can comprise a flashing status, where at least a part of the marker 230 alternates between two colours, sizes and/or shapes at regular intervals. Alternatively, the graphical update can comprise a text update, for example the appearance of letters, words or numbers in the marker indicative of the event. An example of the graphical update is shown in FIG. 5C, in which the marker 230 is an enlarged version of the marker 230 shown in FIG. 5B.

Different graphical updates can be used for different types of event, so that a user viewing the scrolling region 220 can immediately identify the type of event and therefore take a decision on whether to immediately navigate to the marked item 310 in the list. The importance of the event can be indicated by the graphical update. For example a "traffic light" system can be used in which an event of importance or requiring urgent attention is represented by a change to a "red" status whilst a less urgent event is represented by an "orange" status.

The graphical update may also represent the number of events that have occurred in relation to the marked item of information by displaying a numeral in the marker 230. For example if three attendees have changed for the business/social meeting, the number "3" can be shown in the marker 230 to represent that the status of the item 310 has changed three times.

Similarly to the control panel 240 examples discussed above, the user is always able to easily navigate to the business/social meeting (or other information item associated with the marker 230) using the marker 230, regardless of whether the business/social meeting is part of the information currently being displayed in the display window 210. There is no requirement for the user to make a visual search for the business/social meeting by scrolling the information through the display window 210 and checking/waiting for the business/social meeting to appear in the window 210.

Figure 6A:
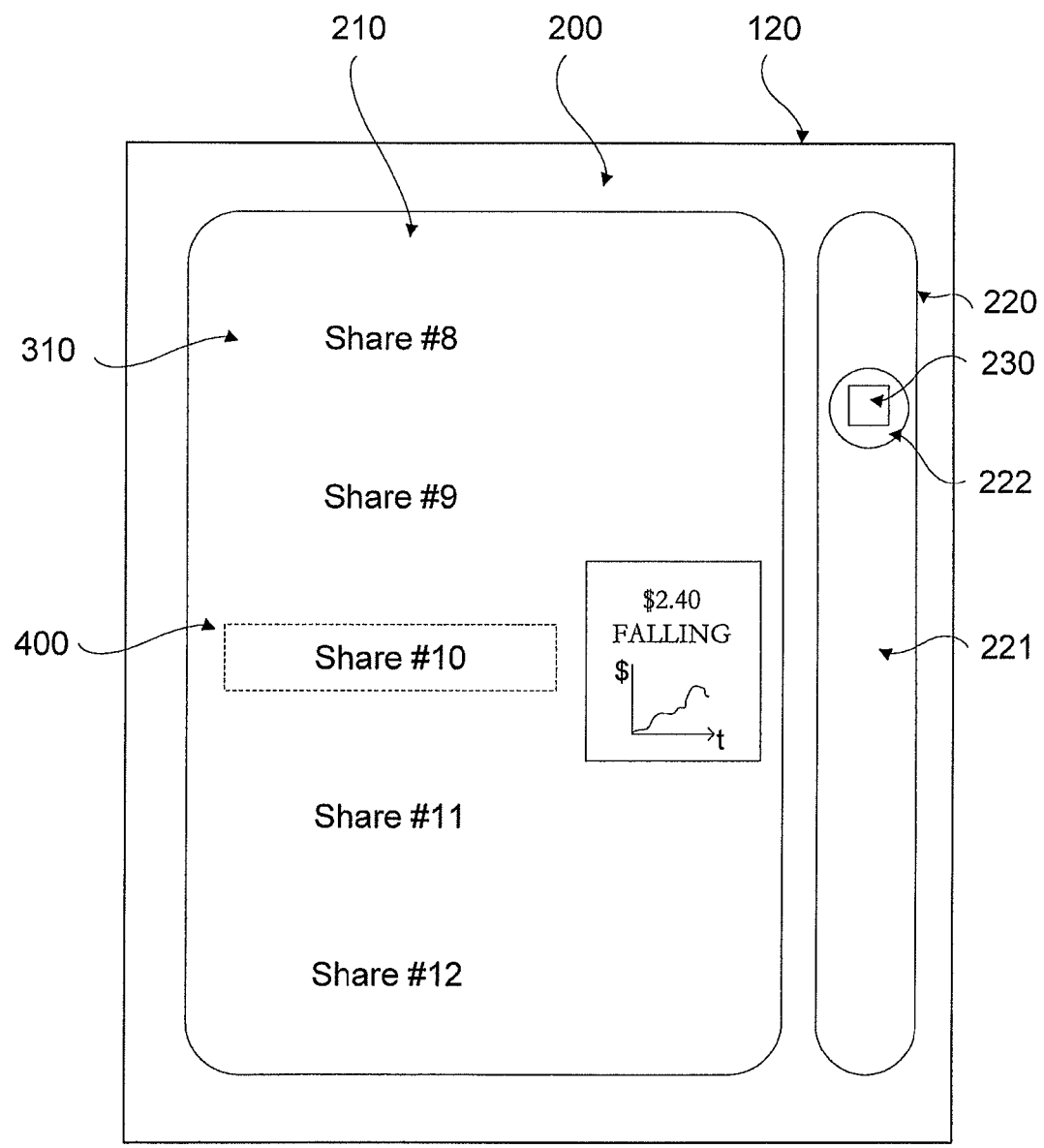
FIG. 6A is an illustration of a first screen shot of a user interface of a trading index. A particular one of a plurality of financial items is marked by a marker in a scrolling region. The marker is displayed in the scrolling region at substantially the same location as a location indicator. The marked item is displayed in a display window.
Figure 6B:
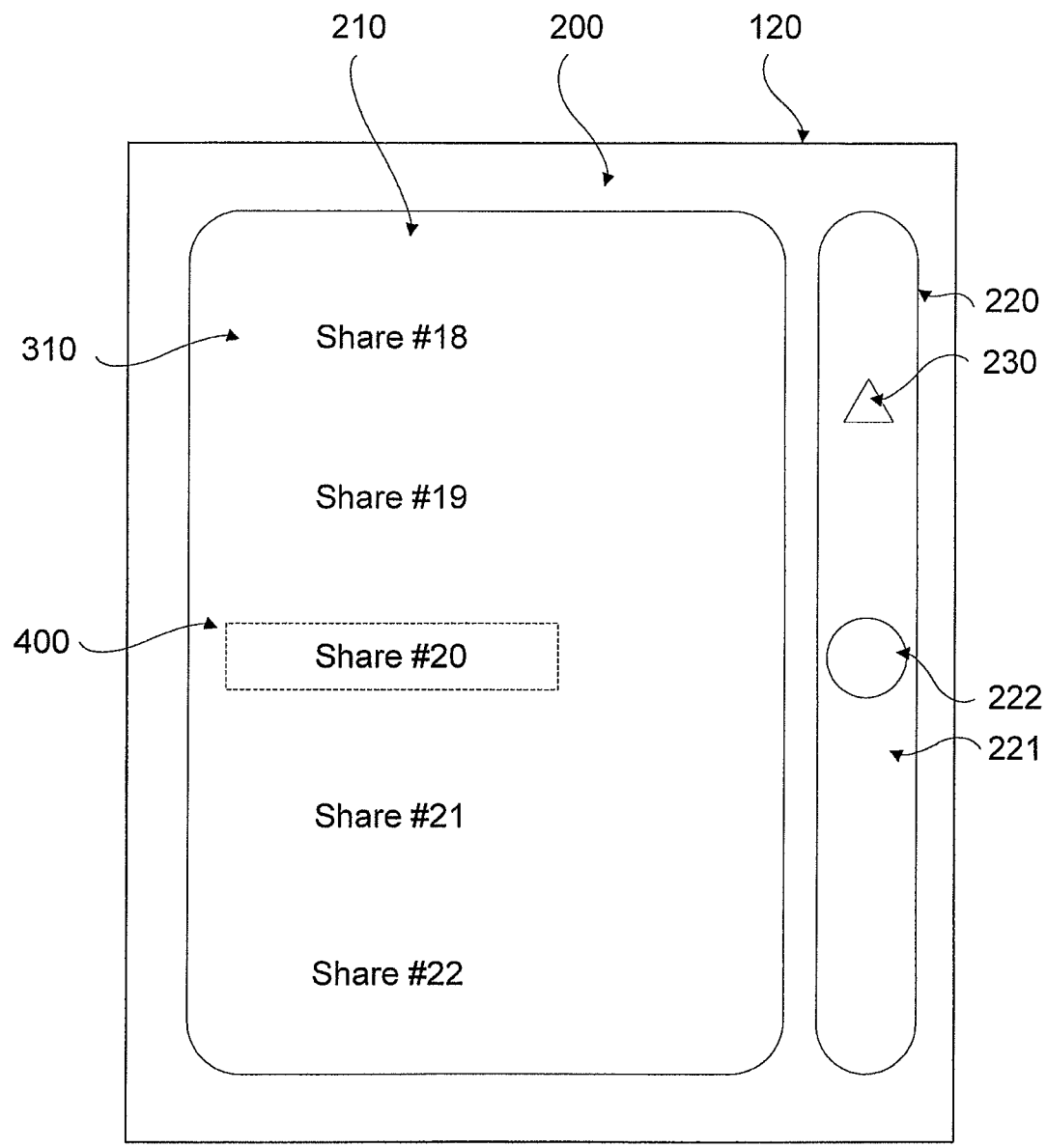
FIG. 6B is an illustration of a second screen shot of the user interface shown in FIG. 6A, in which the location indicator is displayed at a different location in the scrolling region to the marker. The marked item is not displayed in the display window.
Figure 6C:
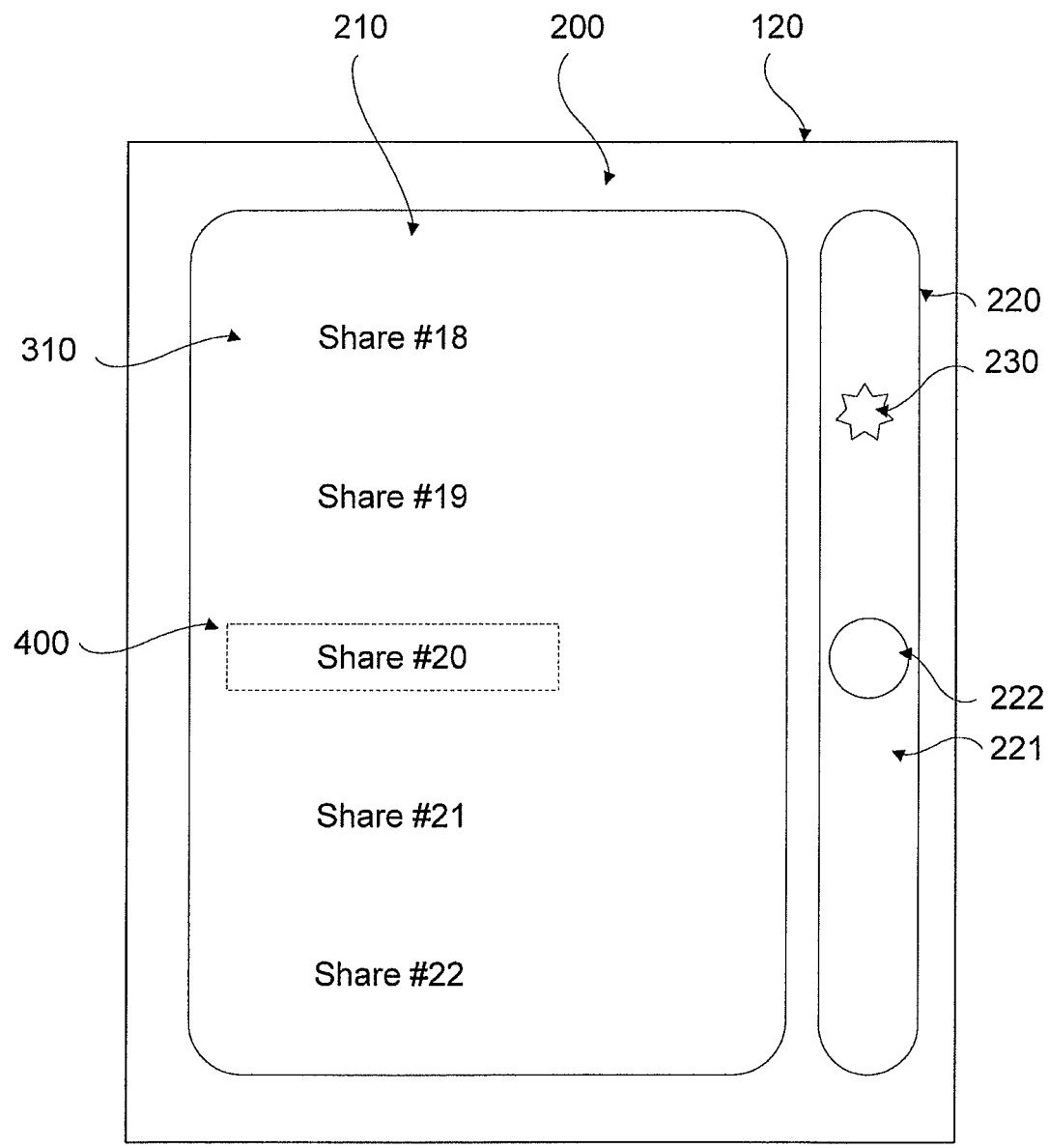
FIG. 6C is an illustration of a third screen shot of the user interface shown in FIG. 6A, in which the marker has been graphically updated by a change in the shape of the marker to represent the occurrence of an event associated with the marked item.

FIGS. 6A, 6B and 6C illustrate another example of the user interface 200. The user interface 200 shown in FIGS. 6A, B and C is associated with a commodity or share price index. A portion of a list of information items 310, in this case shares, commodities and other financial information is displayed in the display window 210. The remainder of the items in the list can be selectively displayed in the display window 210 by scrolling through the list using the scrolling region 220. This can be achieved by moving the location of the position indicator 222 in the scroll bar 221, as previously described.

A user can select one of the items using the cursor/pointer/touch-screen 120, 160 previously described. Selection of an item may cause extra information associated with the item to be displayed in the display window 210. For example, if the selected item is a share in a particular company, the current price together with a price history and an indication as to whether the share price is currently rising or falling can be displayed.

In the example shown in FIGS. 6A, B and C, the marker 230 is associated with the share price of a particular company (Share #10). Therefore, the marker 230 indicates in the scroll bar 221 the relative location of the associated item with respect to the information as whole. It will be appreciated however that the description below could apply to the marker 230 being associated with any other information item 310 from the list.

The marker 230 is graphically updated in response to the occurrence of an event associated with the information item with which the marker 230 is associated. For example, the event can be that the price of the share has risen above/fallen below a predetermined threshold price which has been set by a user. Based on the visual alert provided by the graphical update, the user can then immediately cause the share to be displayed in the display window 210 so that an action such as a buy/sell process can be initiated. The graphical update can correspond to any of the graphical updates previously described. An example of a graphical update to the marker 230 is shown in FIG. 6C, in which the shape of the marker 230 is altered to show a change in status of the marked information item 310 relative to the status of the item 310 in FIG. 6B.

Figure 7:
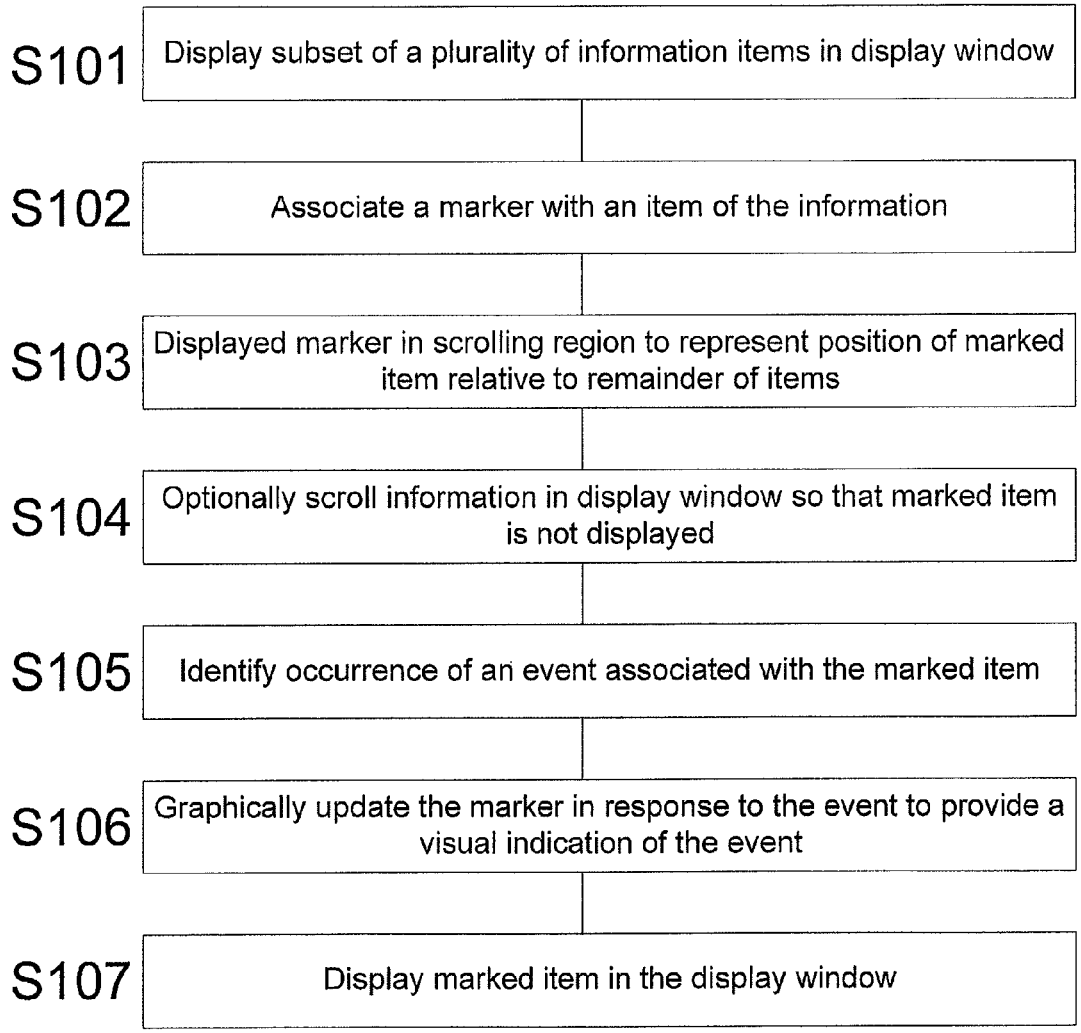
FIG. 7 is a flow diagram of an example method of updating a marker to indicate an event associated with a marked item of information.

An example method, comprising a sequence of steps corresponding to those described in the discussion above, is shown in FIG. 7. At a first step S101, a subset of a plurality of information items is displayed in the display window 210. The subset of information items may comprise any of the information items described above. At a second step S102, a marker 230 is associated with a particular item of information from the plurality of information items. The item of information 310 with which the marker 230 is associated may be automatically selected by the controller 110 based on predetermined criteria, such as in the media player example discussed in relation to FIGS. 4A, B and C. Alternatively, the item of information 310 with which the marker 230 is associated can be based on a user selection. At a third step S103, the marker 230 is displayed in scrolling region 220. The location of the marker 230 in the scrolling region 220 indicates the relative location of the item of information with which the marker 230 is associated in a list of the plurality of information items as a whole. In a fourth step S104, optionally the plurality of information items are scrolled in the display window 210 such that the information item with which the marker 230 is associated is not displayed in the display window 210. In a fifth step S105, an event associated with the information item with which the marker 230 is associated occurs. The event can be any of those discussed above, such as a change in the status or relative location of the marked item within the information as a whole. Other types of event are equally possible. At a sixth step S106, the marker 240 is graphically updated to indicate that the event has occurred so as to provide a visual alert to a user. The visual alert is provided even when the marked item of information is not currently displayed in the display window 210. At an optional seventh step S107, the plurality of information items are scrolled in the display window 210 such that the marked item of information is displayed in the display window 210.

It will be appreciated that steps and operations described above can be performed by the controller 110, using the memory 130, under control of instructions that form part of the user interface 200 (optionally running on the operating system). During execution, some or all of the computer program(s) that constitutes the operating system, the user interface 200 and the media player, social/business networking and trading applications may be stored in the RAM. In the event that only some of this computer program(s) is stored in the RAM, the remainder can reside in the ROM.

It should be realized that the foregoing embodiments should not be construed as limiting. Other variations and modifications will be apparent to persons skilled in the art upon reading the present application. For example, a plurality of markers 230 marking the relative locations of a corresponding plurality of marked information items can be displayed in the scrolling region 220.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. A method comprising:
causing to be displayed in a display window at least one of a defined plurality of information items;
causing to be displayed in a scrolling region a moveable element, wherein the movable element is movable within the scrolling region and represents the position of the at least one of the defined plurality of information items currently displayed in the display window relative to a remainder of the defined plurality of information items which are not currently displayed in the display window;
in response to a scrolling input, moving the moveable element within the scrolling region and causing others of the plurality of information items to be displayed in the display window;
causing to be displayed in the scrolling region in which the movable element is displayed a marker having a predetermined association with one of the plurality of information items,
the position of the marker relative to the moveable element indicating a direction of a scrolling input that would be needed to cause the one of the information items to be displayed in the display window; and
causing the marker currently displayed in the scrolling region in which the movable element is displayed to be updated in response to an event associated with the one of the information items which is not currently displayed in the display window, the updated marker being associated with the one of the information items,
wherein the event is an external event comprising a change in a status of said one of the information items initiated externally when said information item is not currently displayed in the display window, and causing the marker to be updated comprises causing a change in an appearance of the marker when said information item is not currently displayed in the display window and the marker is at its current location in the scrolling region rather than moving the location of the marker or replacing the marker with another marker.

2. A method according to claim 1, wherein the location of the moveable element with respect to the location of the marker in the scrolling region indicates the direction of the scrolling input needed to cause said one information item to be displayed in the display window.

3. A method according to claim 1, wherein:
the location of the moveable element in the scrolling region represents a location of whichever of the information items are currently displayed in the display window with respect to a location of a remainder of the plurality of information items; and
the location of the marker in the scrolling region represents a location of said one information item with respect to a location of a remainder of the plurality of information items.

4. A method according to claim 3, wherein the location of the marker represents the location of said one information item irrespective of the location of the moveable element in the scrolling region.

5. A method according to claim 1, comprising causing said one information item to be displayed in the display window in response to the moveable element being moved to substantially the same location as the marker in the scrolling region.

6. A method according to claim 1, wherein the event comprises a change in position of said one item relative to a location of the remainder of the plurality of information items.

7. A method according to claim 6, wherein updating the marker comprises causing the marker to be displayed in a different position in the scrolling region to reflect the change in location of said one item.

8. A method according to claim 1, wherein updating the marker comprises causing the marker to enlarge or reduce in size.

9. A method according to claim 1, comprising causing a direction indicator to be displayed with the marker to indicate the scrolling direction of the scrolling input needed to cause said one information item to be displayed in the display.

10. A method according to claim 1, wherein causing the marker to be updated in response to an event associated with the one of the information items occurs when the one of the information items with which the marker is associated is not currently displayed in the display window; and comprising
responding to a user input by moving the moveable element to the updated marker and by causing the one of the information items with which the event is associated to be displayed in the display window.

11. The method according to claim 1, wherein said one of the information items with which the marker is associated relates to one or more of activity streams, social events, meetings, appointments or reminders.

12. A non-transitory computer-readable storage medium having stored thereon computer-readable code, which, when executed by a computer apparatus, causes the computer apparatus to:
display in a display window at least one of a defined plurality of information items;
display in a scrolling region a moveable element, wherein the movable element is movable within the scrolling region and represents the position of the at least one of the defined plurality of information items currently displayed in the display window relative to a remainder of the defined plurality of information items which are not currently displayed in the display window;
in response to a scrolling input, move the moveable element within the scrolling region and display others of the plurality of information items in the display window;
display in the scrolling region in which the movable element is displayed a marker having a predetermined association with one of the plurality of information items, the position of the marker relative to the moveable element indicating a direction of a scrolling input that would be needed to cause the one of the information items to be displayed in the display window; and
update the marker currently displayed in the scrolling region in which the movable element is displayed in response to an event associated with the one of the information items which is not currently displayed in the display window, the updated marker being associated with the one of the information items,
wherein the event is an external event comprising a change in a status of said one of the information items initiated externally when said information item is not currently displayed in the display window, and causing the marker to be updated comprises causing a change in an appearance of the marker when said information item is not currently displayed in the display window and the marker is at its current location in the scrolling region rather than moving the location of the marker or replacing the marker with another marker.

13. A non-transitory computer-readable storage medium according to claim 12, wherein updating the marker in response to an event associated with the one of the information items occurs when the one of the information items with which the marker is associated is not currently displayed in the display window; and
wherein the computer-readable code, when executed by computer apparatus, causes the computer apparatus to respond to a user input by moving the moveable element to the updated marker and by causing the one of the information items with which the event is associated to be displayed in the display window.

14. The non-transitory computer-readable storage medium according to claim 12, wherein said one of the information items with which the marker is associated relates to one or more of activity streams, social events, meetings, appointments or reminders.

15. An apparatus comprising:
at least one processor: and
at least one memory including computer program code, wherein the at least one memory and the computer program code are configured, with the at least one processor, to cause the apparatus to:
display in a display window at least one of a defined plurality of information items;
display in a scrolling region a moveable element, wherein the movable element is movable within the scrolling region and represents the position of the at least one of the defined plurality of information items currently displayed in the display window relative to a remainder of the defined plurality of information items which are not currently displayed in the display window;
in response to a scrolling input, move the moveable element within the scrolling region and display others of the plurality of information items in the display window;
display in the scrolling region in which the movable element is displayed a marker having a predetermined association with one of the plurality of information items, the position of the marker relative to the moveable element indicating a direction of a scrolling input that would be needed to cause the one of the information items to be displayed in the display window; and update the marker currently displayed in the scrolling region in which the movable element is displayed in response to an event associated with the one of the information items, the updated marker being associated with the one of the information items which is not currently displayed in the display window, wherein the event is an external event comprising a change in a status of said one of the information items initiated externally when said information item is not currently displayed in the display window, and causing the marker to be updated comprises causing a change in an appearance of the marker when said information item is not currently displayed in the display window and the marker is at its current location in the scrolling region rather than moving the location of the marker or replacing the marker with another marker.

16. An apparatus according to claim 15, wherein the location of the moveable element with respect to the location of the marker in the scrolling region indicates the scrolling direction needed to cause said one of the information items to be displayed in the display window.

17. An apparatus according to claim 15, wherein:

the location of the moveable element in the scrolling region represents a location of whichever of the information items are currently displayed in the display window with respect to a location of a remainder of the plurality of information items; and the location of the marker in the scrolling region represents a location of the said one information item with respect to a location of a remainder of the plurality of information items.

18. An apparatus according to claim 17, wherein the location of the marker represents the location of said one item irrespective of the location of the moveable element in the scrolling region.

19. An apparatus according to claim 15, wherein the at least one memory and the computer program code are configured, with the at least one processor, to cause the apparatus to display said one item of information in the display window in response to the moveable element being moved to substantially the same location as the marker in the scrolling region.

20. An apparatus according to claim 15, wherein the event comprises a change in location of said one item relative to a location of a remainder of the plurality of information items.

21. An apparatus according to claim 20, wherein the at least one memory and the computer program code are configured, with the at least one processor, to cause the apparatus to update the marker by moving the marker in the scrolling region to reflect the change in location of said one item.

22. An apparatus according to claim 15, wherein the event comprises a change in a status of said one item.

23. An apparatus according to claim 15, wherein the at least one memory and the computer program code are configured, with the at least one processor, to cause the apparatus to display a direction indicator with the marker to indicate the scrolling direction needed to cause said one information item to be displayed in the display.

24. An apparatus according to claim 15, wherein updating the marker in response to an event associated with the one of the information items occurs when the one of the information items with which the marker is associated is not currently displayed in the display window, update the marker; and wherein the at least one memory and the computer program code are configured, with the at least one processor, to cause the apparatus to respond to a user input by moving the moveable element to the updated marker and by causing the one of the information items with which the event is associated to be displayed in the display window.

25. The apparatus according to claim 15, wherein said one of the information items with which the marker is associated relates to one or more of activity streams, social events, meetings, appointments or reminders.

* * * * *